(12) United States Patent
Maywar et al.

(10) Patent No.: US 6,456,417 B1
(45) Date of Patent: Sep. 24, 2002

(54) ALL-OPTICAL FLIP-FLOP DEVICE

(75) Inventors: Drew Maywar; Govind P. Agrawal, both of Rochester, NY (US); Yoshiaki Nakano, Tokyo (JP)

(73) Assignees: University of Rochester, Rochester, NY (US); University of Tokyo, Tokyo (JP)

( * ) Notice: Subject to any disclaimer, the term of this patent is extended or adjusted under 35 U.S.C. 154(b) by 0 days.

(21) Appl. No.: 09/589,882

(22) Filed: Jun. 9, 2000

(30) Foreign Application Priority Data

Dec. 10, 1999 (JP) ............................................ 11-351397

(51) Int. Cl.[7] ............................ H04B 10/12; G02F 1/03; H01J 40/14
(52) U.S. Cl. ........................ 359/245; 359/243; 359/173; 359/179; 250/214; 385/17
(58) Field of Search ................................ 359/243, 245, 359/154, 160, 173, 237, 179, 214; 385/17

(56) References Cited

U.S. PATENT DOCUMENTS 4,985,621 A * 1/1991 Aull et al. .................. 250/214

OTHER PUBLICATIONS

Postdeadline Papers, *Optical Amplifiers and Their Applications Topical Meeting*, Friday Jun. 11, 1999, Nara, Japan, 6 pp. Including cover sheet.

D.N. Maywar et al., Robust optical control of an optical–amplifier–based flip–flop, Jan. 31, 2000, vol. 6, No. 4, Optics Express, pp. 75–80.

D.N. Maywar et al., *Semiconductor Optical Memory Based on DFB Amplifier*, Nov. 20, 19999, pp 83–87 wich cover sheet attached.

D.N. Maywar et al., *Wavelength Conversion Using an Optical Gain–Pump*, Aug. 27, 1999, pp 43, 44 and tow pages unnumbered with cover sheet attached.

* cited by examiner

*Primary Examiner*—Georgia Epps
*Assistant Examiner*—Tim Thompson
(74) *Attorney, Agent, or Firm*—Blank Rome Comisky & McCauley LLP

(57) ABSTRACT

A bistable optical device such as a semiconductor optical amplifier (SOA) emits an output beam at either a high level or a low level, depending on which of the two stable states the device occupies. The device is switched between the two stable states without a need for a change in the input holding power by changing the hysteresis of the device. The hysteresis is changed by the application of set and reset optical pulses which change the gain and therefore the refractive index of the device. The device has applications to optical communication and computing systems such as optical memory, wavelength conversion and pulse length conversion.

28 Claims, 5 Drawing Sheets

ALL-OPTICAL FLIP-FLOP DEVICE

FIELD OF THE INVENTION

The present invention is directed to an all-optical flip-flop device for optical communication networks and more specifically to such a device having all-optical set and reset capabilities.

DESCRIPTION OF RELATED ART

According to the *Photonics Spectra* May 2000 issue, the global optical networking market totaled $3.9 billion in 1999 and will grow in 2004 to $17 billion, of which $15 billion will be in long-haul networks and $2 billion in metropolitan systems. That phenomenal growth reflects the demands of the Internet and is expected to continue to be accompanied by a high investment in new technology.

Optical communication networks have a need to convert the short pulses sent on backbone and trunk lines at 10 Gb/sec or faster to the longer pulses used on local networks. Such networks often also have to convert frequencies, since it is often advantageous to operate local networks on a different frequency from that used for backbone and trunk lines. Such conversion can now be done on wavelength division multiplexed (WDM) systems by converting the optical signals to electronic signals and converting those electronic signals back to optical signals by way of a photodetector, an electronic decision circuit and an output laser. Pulse length conversion is not done routinely in communication networks, because the existing technology is expensive.

Various options are being considered for all-optical switches. One such option is MEMS (micro-mechanical systems), offering a switch time of 10–50 msec. Others are liquid crystal technology, offering a switch time of 4–10 msec, and bubble-jet technology, offering a switch time of 10 msec.

The bistable behavior of optical signals propagating through resonant-type semiconductor optical amplifiers (SOAs) has been used to demonstrate optical switching. Those devices are useful for lightwave systems because they are compact, can be fabricated at any wavelength, and exhibit inherent amplification and therefore high fan-out and high cascadability. Switching in such devices has been measured at microwatt power levels. Thus, those devices easily operate at power levels available in lightwave systems. Since typical switching speeds are on the order of 1 ns, switching occurs at femtojoule energies (~7000 photons).

Another developing area in optical computing and communication systems is optical memory. All-optical digital memory promises many advantages for optical communication systems. Compared to electronic digital memory, the optical domain promises faster speeds of greater than 10 Gb/s. Furthermore, the above-noted necessity for optical-to-electronic and electronic-to-optical conversion is avoided, which would allow the memory function of a optical network node to be integrated with other photonic functions, such as wavelength conversion and routing.

Optical memory has been demonstrated using high-speed fiber loops, but that method supports only analog formats, exhibits fixed memory durations, and is typically bulky. In contrast, optical memory exhibited by bistable semiconductor lasers offers digital operation within a compact device. Flip-flop operation based on polarization bistability in semiconductor lasers is expected to be ultrafast (~100 Gb/s), but requires orthogonally polarized control pulses that would be expensive to maintain in a fiber-optic system. Diode lasers with integrated absorption regions have been used at sub-milliwatt powers over a 28-nm spectral range, but it is difficult to perform both set and reset optically. Flip-flop operation can also occur with a holding beam undergoing dispersive bistability within a resonant-type semiconductor optical amplifier (SOA), but those previous control techniques have a very limited wavelength range; set and reset occur either by varying the holding-beam input power or by modulating the holding beam with a closely tuned (0.008 nm) auxiliary signal.

SUMMARY OF THE INVENTION

It will be apparent from the above that a need exists in the art for an optical switch, memory or other device which overcomes the above-noted difficulties.

It is therefore an object of the invention to provide a bistable optical device which can be switched between its stable states using temporally short pulses.

It is another object of the invention to provide a bistable optical device which can be switched between its stable states with low power consumption.

It is yet another object of the invention to provide such an optical switch, memory or other device which can be switched optically, so that no optical-to-electronic conversion is required.

It is yet another object of the invention to provide such an optical switch, memory or other device which can operate with control signals over a wide wavelength range.

It is yet another object of the invention to provide all-optical processing at data rates beyond those inexpensively accessible by electronic processing by providing such an optical switch, memory or other device which can operate using pulses shorter than 100 ps.

It is yet another object of the invention to provide such an optical switch, memory or other device which can operate at low power levels (<1 mW) over a wide and flexible wavelength range, and which can be transparent to the control signals' polarization.

It is yet another object of the invention to provide such an optical memory which can store data digitally.

It is yet another object of the invention to provide such an optical switch, memory or other device which is compact.

It is yet another object of the invention to provide such an optical switch, memory or other device which latches to a desired state.

To achieve the above and other objects, the present invention is directed to a bistable device whose holding beam is set and reset by varying the hysteresis itself. As the hysteresis varies, so does the transition between the two stable states, so that the device goes back and forth between the two stable states with a constant holding beam input power. The hysteresis is typically changed by applying one or more optical signals, such as separate set and reset pulses, to change the gain and therefore the refractive index of the bistable device. The set pulse or reset signal can be modulated in accordance with data, or a data signal from another optical device can be directly used as a set pulse or reset signal.

The holding beam can operate at microwatt power levels and experiences amplification. Once switched to the upper state, the output power of the holding beam remains high until reset. Thus, both an optical switch and an optical memory, as well as other uses, can be implemented.

The small size and integratability of SOAs allow, in principle, the fabrication of monolithic optical buffers. Such devices would be more compact than fiber-delay lines. For example, an array of 32 amplifiers can be used for storing the packet header required for routing signals through a cross-connect optical circuit.

The present invention provides all-optical mechanisms for such setting and resetting over wide wavelength ranges.

The latching capability of an optical flip-flop allows the output to be maintained for processing at a later time. A digital, sequential means of processing is thus available for applications such as bit-length conversion, data-format change, demultiplexing, packet-header buffering and retiming.

The present invention provides robust optical techniques for controlling a resonant-type-SOA-based optical flip-flop. Set and reset are performed by XPM (cross-phase modulation), rather than by changing the input power of the holding beam. Control signals operate at submilliwatt powers over wide wavelength ranges that intersect important communication bands centered near 1310 and 1550 nm. XPM is transparent to the direction of incidence, and reset is independent of polarization. The set-signal polarization dependence can be eliminated, and repetition rates greater than 10 Gb/s can be achieved. The latching capability of such a fast, robust all-optical flip-flop will significantly advance the development of all-optical digital processing within communication systems.

The present invention, because of its latching capability, can increase the pulse length (increasing the energy in the pulse), while it simultaneously performs a wavelength conversion. In addition to the capability for pulse length conversion, the latching capability holds the signal in memory and provides the opportunity to change the data format with the device. The present invention has still further utility as an optical memory with a digital response with pulses shorter than 100 ps.

BRIEF DESCRIPTION OF THE DRAWINGS

A preferred embodiment of the present invention will be set forth in detail with reference to the drawings, in which.

DETAILED DESCRIPTION OF THE PREFERRED EMBODIMENT

Figure 1:
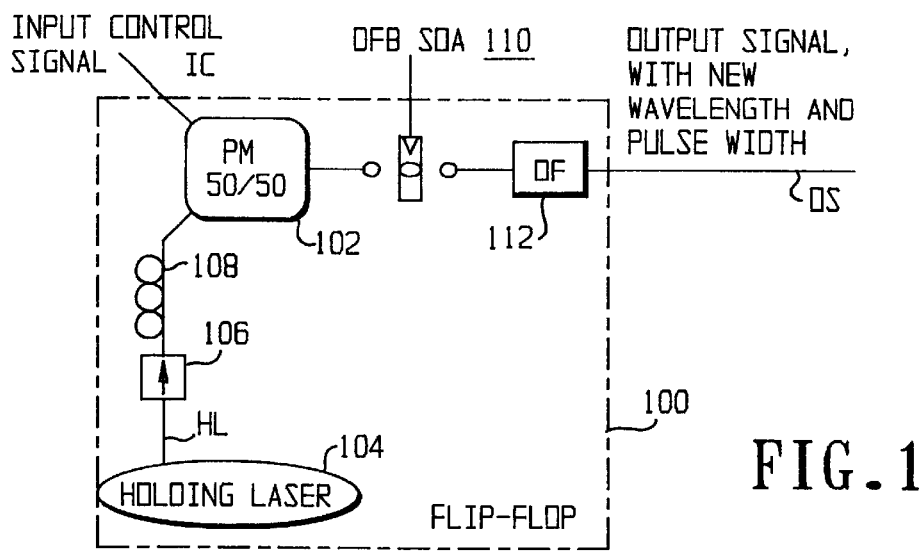
FIG. 1 shows a block diagram of an optical flip-flop using a semiconductor optical amplifier according to the preferred embodiment of the present invention.

Preferred embodiments of the invention will now be set forth with reference to the drawings, in which the same reference numerals refer to like elements throughout.

FIG. 1 shows an overview of a flip-flop device according to the preferred embodiment of the present invention. As shown in FIG. 1, an input control signal IC, which can be a data signal from an external optical device at a remote location in an optical network, is received into the flip-flop 100. In the flip-flop 100, the input control signal IC is coupled in a polarization-maintaining 50/50 coupler 102 with a holding laser beam HL emitted by a holding laser 104 through an isolator 106 and a length of polarization-controlling fiber 108. The combined beam is applied to a DFB (distributed feedback) SOA 110, which then changes its bistable state by a change in hysteresis in a manner to be explained below. Alternatively, a Fabry-Perot type semiconductor optical amplifier could be used. The output signal OS, with a new wavelength and pulse width, passes through an optical filter 112, which filters out the input control signal wavelengths and passes only the new output wavelength.

The device of FIG. 1 can be used as an optical memory. While FIG. 1 shows only a single bit of memory, semiconductor optical amplifiers can be built on a very small scale, similar to that of vertical cavity surface emitting lasers (VCSEL). The VCSEL-like array of semiconductor optical amplifiers driven as shown in FIG. 1 can be used as a very fast optical memory of useful size. A digital memory having the structure of FIG. 1 has been experimentally shown to provide a switching time as short as 700 ps. Prototype testing to date has demonstrated set and reset functions operating between 1537 nm and 1567 nm at low power (<1 mW) and >6-dB contrast.

Figure 2:
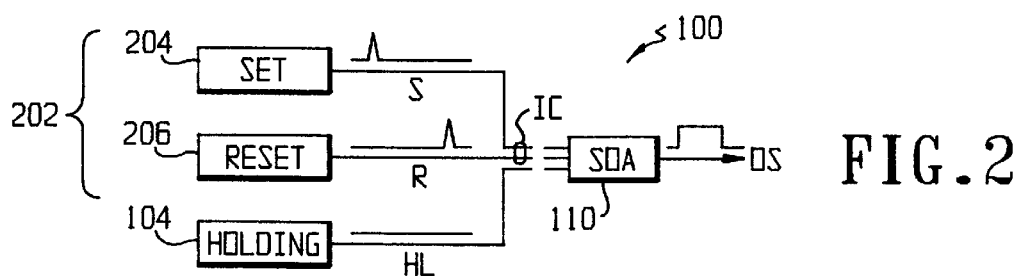
FIG. 2 shows the application of set, reset and holding signals to the semiconductor optical amplifier of FIG. 1 and the resulting output signal.

FIG. 2 shows the operation of the flip-flop 100 of FIG. 1. As described above, the DFB SOA 110 receives a holding laser beam HL at a constant power from the holding laser 104. Also, the DFB SOA 110 receives the input signal IS from an input signal source 202, which includes a set laser 204 for emitting a set pulse S and a reset laser 206 for emitting a reset pulse R; the pulses S and R make up the input signal IS. The input signal source 202 can be provided locally or remotely; in the latter case, the input signal IS can be received over an optical communication line.

Setting and resetting the output signal OS, or in other words controlling the output signal OS to go between the higher and lower states shown for the output signal OS in FIG. 2, is accomplished through varying the hysteresis of the DFB SOA 110, while keeping the input power provided by the holding laser beam HL fixed. One way to change the hysteresis is by varying the gain in the DFB SOA 110. By decreasing the gain, the switching powers of the hysteresis decrease. That phenomenon can be understood as follows. A decrease in gain in active semiconductors is accompanied by an increase in the refractive index as embodied by the well-known linewidth enhancement factor. That increase in refractive index moves the Bragg resonances of the amplifier to longer wavelengths, and toward the optical signal. Since the signal is closer to the resonance, it requires less power to seed bistable switching. Increasing the gain has the opposite effect. Thus, latching and unlatching are possible. The set and reset pulses S and R control the DFB SOA 110 to decrease and increase its gain in a manner to be described, thus causing the output signal OS to go between its lower and higher levels.

Figure 3B:
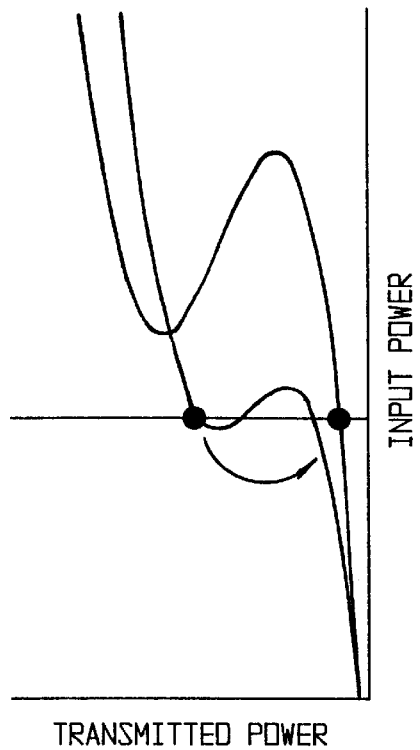
FIGS. 3A and 3B show hysteresis curves of changes in gain for setting and resetting, respectively, the optical flip-flop of FIG. 1.
Figure 3A:
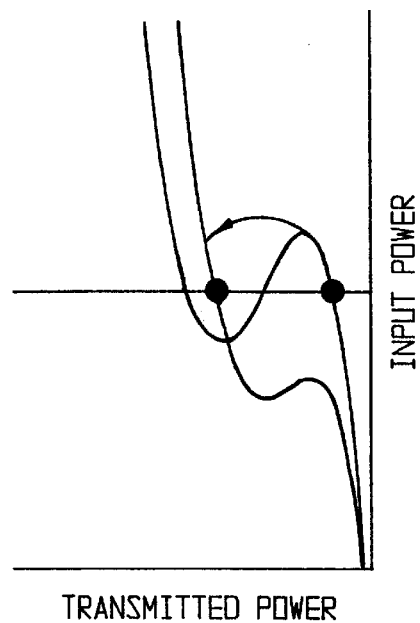

A CW (continuous wave)-holding beam will switch between lower to higher branches as the switching threshold of the hysteresis crosses the input power of the holding beam. In particular, the holding beam can be set and reset by varying the hysteresis as shown in FIGS. 3A and 3B, which show hysteresis curves plotted with the input power of the holding laser beam HL as the horizontal axis and the transmitted power of the output signal OS as the vertical axis. The holding laser beam HL begins on the lower branch and in the middle of a hysteresis. A transient decrease in gain, as shown in FIG. 3A, pushes the hysteresis to smaller switching powers, allowing the holding beam to switch to the higher branch, where it remains even after the gain recovers. To reset the holding-beam output state, as shown in FIG. 3B, the gain is transiently increased. That pushes the hysteresis to higher powers, and allows the holding beam to switch back down to the lower branch. Once the increase in gain dies off, the output power returns to its original output state.

A decrease in gain can be achieved optically via gain saturation caused by a signal with any wavelength that falls with the gain spectrum of the amplifier. Such a set process is ideal for WDM systems. The data signal itself can be used directly to set the flip-flop. The holding beam "remembers" the occurrence of the data signal until it is reset by an increase in gain. That increase in gain can be achieved optically via gain pumping by a signal that is absorbed by the amplifier, e.g., a signal that is outside the gain spectrum on the short wavelength side. Such a signal can be sent at regular intervals and can act as a clock for the memory system.

Figure 3C:
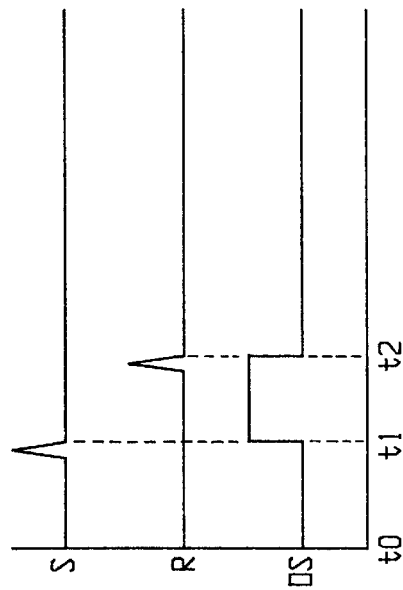
FIG. 3C shows a waveform diagram of a response of the device of FIG. 1 to the setting and resetting pulses.

The device 100 can thus operate as an all-optical flip-flop with latchable output power controlled by optical signals, as depicted in FIG. 3C. At an initial time to, the device 100 is in its initial state, which is at the low level. When an optical set signal S is applied to the device 100 at time t1, the optical output signal OS attains the high level and remains at the high level until an optical reset signal R is applied at time t2. Thus, the output signal OS is at the high level between times t1 and t2 and at the low level otherwise. In other words, the device 100 "remembers" that it has been set until it is reset. The device 100 operating as a flip-flop can thus be triggered directly by signals from other all-optical gates, allowing the creation of highly functional photonic circuits without electronic-conversion components.

Figure 4:
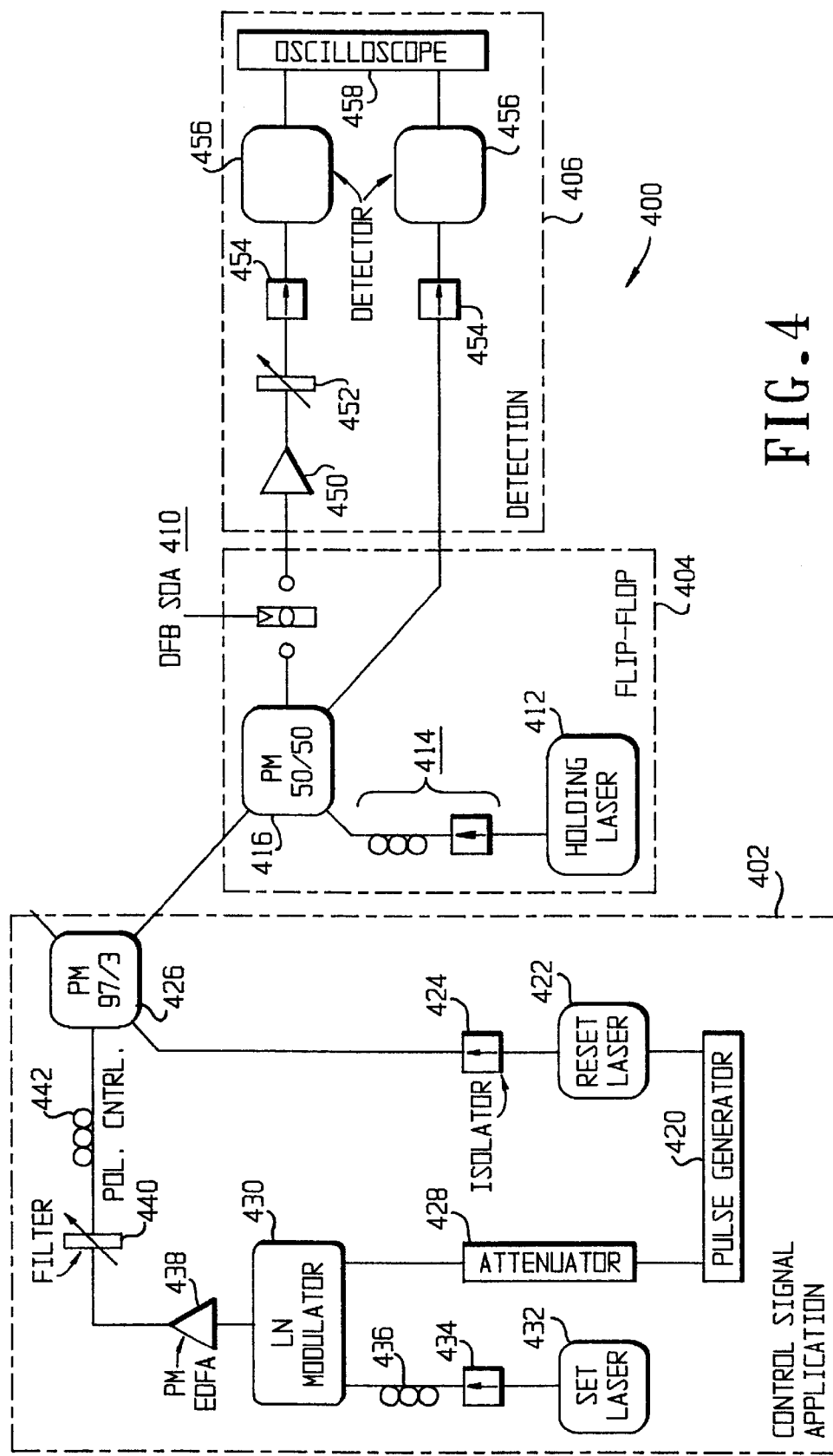
FIG. 4 shows a block diagram of an experimental system incorporating the flip-flop of FIG. 1.

A working device which has been experimentally verified to operate as explained above is shown in FIG. 4. The experimental device 400 includes a control signal application component 402, a flip-flop 404 and a detection component 406.

The flip-flop 404 is a specific embodiment of the flip-flop 100 of FIG. 1 and includes a commercially available, multi-quantum-well (MQW), distributed feedback (DFB) laser 410 driven at about 97% lasing threshold as the resonant-type SOA. The dominant Bragg resonance of the device occurs near the center of the DFB stopband (determined by the grating phase at device facets); the stopband is located at 1547 nm, about 20 nm shorter than the gain peak. The holding beam from a holding laser 412 is coupled into the DFB SOA 410 using a polarization-maintaining (PM) lensed fiber 414 connected to one branch of a 3-dB PM fiber coupler 416. The holding beam from the holding laser 412 is fixed at a constant input power and tuned close to the DFB Bragg resonance, and its polarization is aligned with the transverse-electric (TE) mode of the SOA gain region.

Optical control signals from the control signal application component 402 enter the flip-flop 404 via the other input branch of the fiber coupler 416. Set and reset pulse trains are generated using a single 3.5-GHz-bandwidth pulse generator 420 and separated in time by traversing different path lengths. 1.31-$\mu$m reset pulses were generated by direct modulation of a reset laser 422 and passed through an isolator 424 and the dominant port of a 97/3 PM fiber coupler 426. For the set pulse trains, the output of the pulse generator 420 is applied through an attenuator 428 to an LN modulator 430, which is a 5-GHz LiNbO$_3$ modulator. Light from a set laser 432 is applied through an isolator 434 and a PM fiber 436 to the modulator 430, which modulates the light in accordance with the signals received through the attenuator 428 to produce a set pulse train. Using the 3% port for the set signals requires an erbium-doped fiber amplifier (EDFA) 438 to boost the optical pulses. The EDFA is not required if, for example, a wavelength-division-multiplexing (WDM) coupler is used instead. The output of the EDFA 438 is applied through a filter 440 and a polarization controlling fiber 442 to the 3% input port of the fiber coupler 426. The polarization of both signals is controlled and preserved through PM fibers.

In the detection component 406, the flip-flop output is amplified by an EDFA 450 for accurate measurements. A tunable filter 452 is used to remove the wideband EDFA amplified spontaneous emission (ASE) and to block the amplified set pulses. All signals are passed through isolators 454 and measured with detectors 456 having bandwidths exceeding 20 GHz and a 500-MHz real-time oscilloscope 458.

Figure 5A:
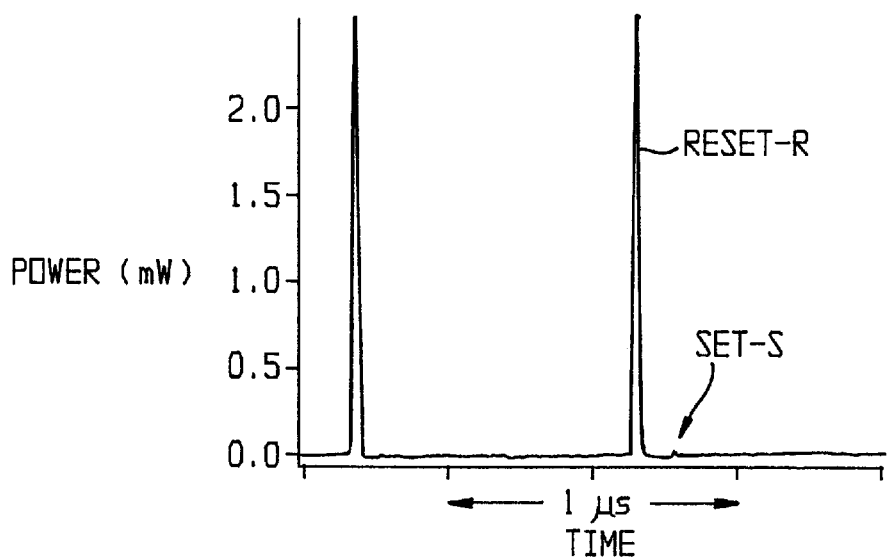
FIG. 5A shows set and reset pulses applied to the device of FIG. 4.

Control signals for a typical experiment are shown in FIG. 5A. The 1567-nm set signals S have a peak power of 22 microwatts and a pulse energy of 330 fJ. The power is measured in the reference arm and scaled to give the power within the tapered fiber before the DFB SOA. The set signal depletes the SOA charge carriers via stimulated recombination, thereby increasing the refractive index at the holding-beam wavelength. That kind of XPM (cross-phase modulation) is commonly used for SOA-based interferometric wavelength conversion. The device 400 uses XPM to shift the SOA Bragg resonance to longer wavelengths and through the holding-beam wavelength. As a result, the upward-switching threshold of bistability passes through the CW holding-beam input power, forcing the holding-beam output power of the output beam O to switch to the higher state, as seen in FIG. 5B.

Figure 5B:
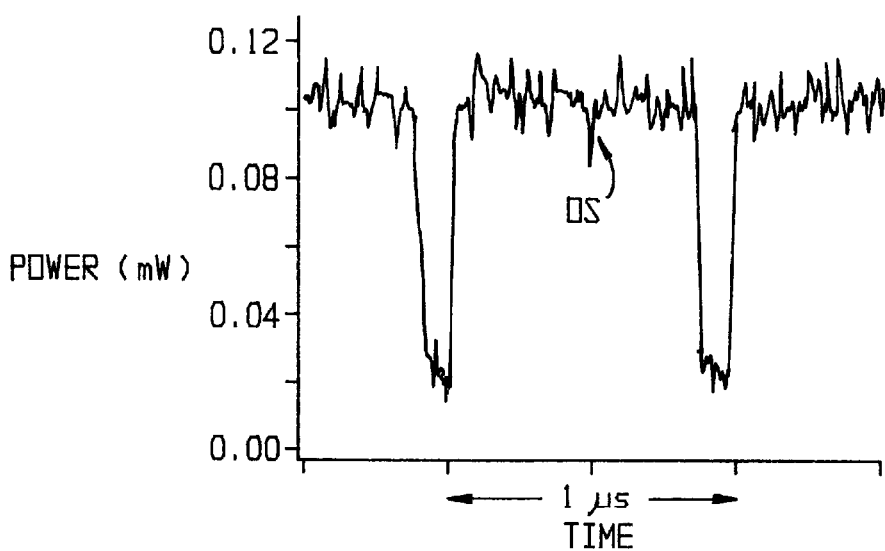
FIG. 5B shows the response of the device of FIG. 4 to the set and reset pulses of FIG. 5A.

The holding-beam power of FIG. 5B is forced to return to the lower output state by a 1306-nm reset signal R. The 36-pJ reset signals are absorbed by the SOA, thereby raising electrons to the conduction band and decreasing the refractive index experienced by the holding beam. That refractive-index change has been verified in a separate experiment by observing the DFB-SOA ASE spectrum shift to shorter wavelengths under the influence of a CW 1306-nm signal. Reset to the lower state occurs as XPM shifts the Bragg resonance towards shorter wavelengths, forcing the downward-switching threshold of bistability through the holding-beam input power. The reset operation is remarkable not only because it is performed by a "positive" optical pulse, but also because it changes the refractive index in the opposite way as the set pulse.

The control signals, namely, the set signal S and the reset signal R, toggle the holding beam output signal OS shown in FIG. 5B with a 6.2-dB contrast between 25- and 105-$\mu$W output states. The power shown in FIG. 5B is scaled to give the amount within the fiber, after the DFB SOA and before the EDFA. Since the input power used in the experiments was 65 $\mu$W, the holding beam experiences a small fiber-to-fiber set-state gain. The holding-beam wavelength is limited to arange of 0.004 nm to achieve flip-flop operation. The spectral range can be increased by using a chirped-grating DFB SOA. Moreover, precise control of the holding-beam wavelength can be achieved by integrating the holding laser onto the same chip as the DFB SOA, writing both gratings with an electron beam.

The set state shown in FIG. 5B is maintained for 0.824 μs. The experimental demonstration of a long, static set is important because it shows unambiguous latching of the flip-flop, and not just a slow response of, for example, carrier recovery. Used as a pulse-length converter, the all-optical flip-flop transforms the 15-ns input pulse to an 824-ns output pulse, simultaneously performing wavelength conversion from 1567 to 1547 nm. The downward bit-length conversion process can be used to transfer data from high-speed trunk lines to low-speed local-access systems without using the optical-to-electronic-to-optical conversion described above for the prior art.

Figure 6A:
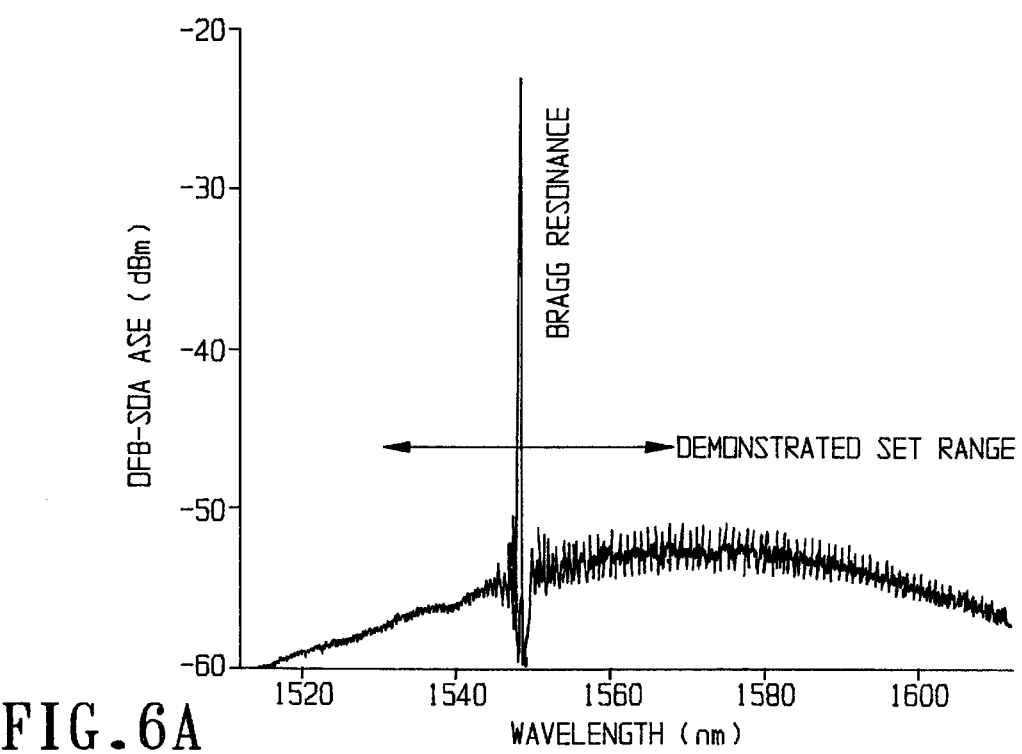
FIG. 6A shows a demonstrated set range for the device of FIG. 4.

XPM optical-control techniques allow flip-flop operation over a wide range of wavelengths. The use of an external-cavity tunable diode laser has been experimentally confirmed to allow set operation from 1533 to 1568 nm, as depicted in FIG. 6A. The short-wavelength bound of that range is the wavelength at which the set signals lose their ability to saturate the gain. The upper bound is imposed by the poor amplification of the EDFA at long wavelengths and will differ in systems not using an EDFA. Since 1568 nm is near the peak of the SOA gain spectrum, the set range can be extended at least 20 nm to longer wavelengths. Such a large (>50 nm) wavelength range is ideal for WDM lightwave systems; signals from a wide range of communication channels can set the optical flip-flop.

Figure 6B:
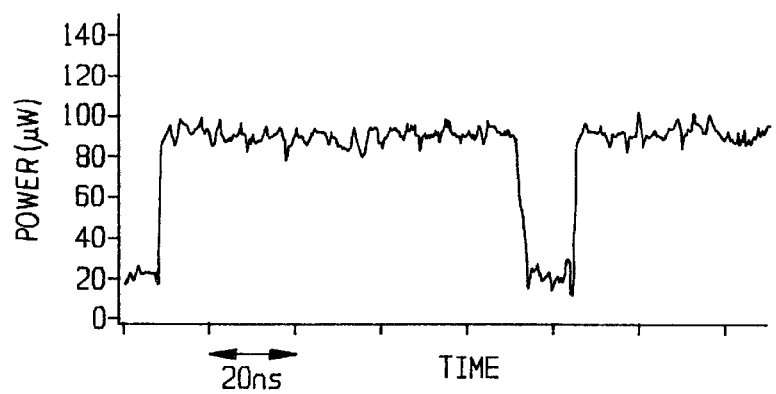
FIGS. 6B and 6C show responses of the device of FIG. 4 to set and reset pulses of varying wavelengths.

The set-signal wavelength range extends on both sides of the Bragg resonance. Flip-flop operation for 1537-nm set signals having a pulse power of 0.9 mW (and energy of 18 pJ) is shown in FIG. 6B, in which the reset pulses are the same as for FIG. 5A. Thus, the XPM-setting technique works for signals that interact with the carrier-density distribution at lower or higher energies than the holding beam. Although 1567-nm set signals could be as low as 22 μW (probably resulting from high amplification at that wavelength), the minimum allowable optical power at 1537 nm was about 85 microwatts. Those powers are low enough that optical signals directly from the communication system can set the flip-flop without pre-amplification.

Figure 6C:
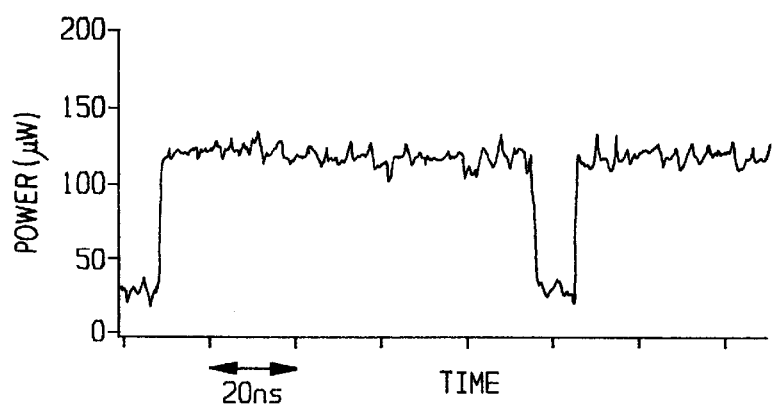

The broad wavelength range demonstrated for the set signal is eclipsed by that of the reset signal. The holding-beam power shown in FIG. 6C has been reset using an EDFA-pump laser at 1466 nm (with pulse widths of 15 ns, and energies of 1.98 and 0.77 pJ for the reset and set signals, respectively). Reset occurs over the intermediate 160-nm spectral range between 1306 and 1466 nm, and extends down to much shorter wavelengths; any optical frequency that excites electrons to the conduction band can reset the flip-flop. Most importantly, all signals within the 1310-nm communication band can perform the reset function. Reset signal powers of 1306 nm are typically required to be above 0.7 mW.

Optical reset has been found to be transparent to the polarization of the 1306- and 1466-nm signals. However, flip-flop operation is dependent on the polarization of the set pulses. The polarization dependence for gain-saturating pulses is well known, and can be significantly reduced by using techniques such as growing the gain-region depth to the same scale as its width, or by using strained quantum wells.

Since the role of the control signals is only to change the carrier distribution, they are not required to enter the SOA in a co-propagating direction with the holding beam; XPM was observed for control pulses entering either SOA facet. Control signals can even enter from an off-axis direction. Transparency to incident direction allows flexibility in designing the control-signal input system, as well as in specifying the exiting direction of the amplified set pulses.

High-speed operation of the device 400 is limited by the low modulation bandwidth of the directly modulated reset laser (about 1 GHz). External modulation of the reset laser can provide higher speeds. Using a pulse-generator rate of 3.44 Ghz, it has been experimentally shown to permit pulse widths of 400 ps and 1 ns for the set and reset signals, respectively. Because of the wide reset pulses, clear flip-flop operation required a "10000000" data pattern, which resulted in a pulse-train period of only 2.4 ns.

The physical limit to the speed of SOA devices is often governed by the carrier recombination lifetime, which can be as low as 200 ps using a high carrier density. High densities can be achieved in DFB SOAs by using spatially chirped gratings, because of an increase in the lasing threshold. In addition, a strong auxiliary gain-saturating signal has been used in SOAs to reduce the lifetime to ~10 ps. The optical-control techniques disclosed above allow repetition rates faster than the carrier recombination lifetime; set and reset signals cause opposite changes in the refractive index, and may force the system to toggle back and forth at the rate of stimulated emission and absorption.

The set and reset signals are of different wavelengths from the holding-beam wavelength.

Thus, flip-flop operation can be understood as wavelength conversion of the control-signal data to the holding beam.

Experiments show the following effects of gain pumping and gain saturating on the bistable hysteresis of the DFB SOA.

For the case that the holding beam is tuned out of the bistable region and to lower powers than the switching thresholds of the bistable hysteresis, using gain-saturating pulses, the hysteresis is transiently shifted completely through the holding beam.

That new type of noninverted wavelength conversion occurs at optical powers on the order of 10 microwatts. The configuration has been operated with the gain-saturating signals travelling in co- and counter-propagating directions relative to the holding beam, and for a variety of wavelengths.

Next, the effect of the gain-pumping signal was tested by tuning the input power of the holding beam higher than the switching thresholds of the bistable hysteresis. Using gain-pumping pulses, the hysteresis was transiently shifted completely through the holding beam. The output power of the holding beam switched down and up accordingly. Those experiments were performed with both a commercially available 1.48-μm laser and a 1.3-μm laser as the pump. Wavelength conversion occurs at optical powers on the order of 500 microwatts. That configuration was also operated with the gain-pumping signals propagating co- and counter-directionally with the holding beam.

Two techniques for the transfer of data to a wavelength-converted signal will now be discussed. The techniques have both been experimentally verified, as will be explained below.

Figure 7:
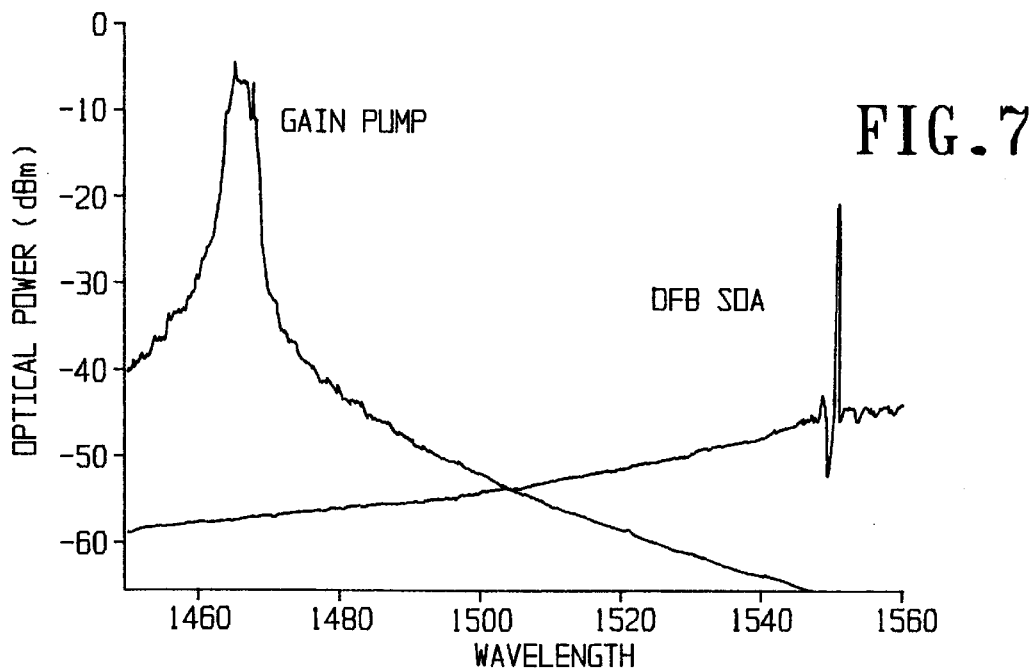
FIG. 7 shows optical powers of a gain pump and a semiconductor optical amplifier as functions of wavelength.

An optical pump increases the amount of gain within the SOA by raising electrons from the valence band to the conduction band. Pumping is achieved by signals with wavelengths that are shorter than the wavelengths spanned by the amplifier-gain spectrum. The spectra of the optical gain-pump and SOA used in an experiment are shown in FIG. 7. The Bragg resonances of the DFB SOA occur at the short-wavelength end of the amplifier-gain spectrum; the pump wavelength is clearly far enough detuned from the SOA gain spectrum to provide gain.

As an optical gain pump, a commercially available Fabry-Perot diode laser was used that is typically used to pump erbium-doped fiber amplifiers (EDFAs). Although the linewidth of that laser is large (~5 nm), a narrow linewidth (with enough intensity) can also be used to pump the amplifier efficiently.

The DFB SOA used in the experiment was a commercially available, MQW diode laser driven below the lasing threshold. For FIG. 7, the amplifier is electrically pumped at 99% of its lasing threshold. High amounts of electrical pumping like that can give rise to wavelength conversion without a probe signal; the optical-pump signal provides enough gain to lase the amplifier or strengthens the Bragg resonance such that its ASE produces a measurable signal. Those effects were avoided in the experiments.

The data carried by the optical-pump signal are transferred to the probe beam, thereby resulting in a wavelength converted signal carrying the data. Although the necessity of a probe beam increases the number of components required for wavelength conversion, probe beams are common for many kinds of wavelength conversion, including those based on XGM, XPM and four-wave mixing (FWM).

The wavelength of the probe beam affects the behavior of the converted signal. In particular, tuning the probe-beam wavelength across the Bragg resonance of the DFB SOA yields two distinct types of wavelength conversion, which will now be described.

If the probe-beam wavelength is chosen to fall within the SOA gain spectrum, then data can be transferred from the pump signal via the following process. The 1470-nm signal increases the gain in the amplifier, and as a result, the probe signal experiences greater amplification. Thus, the output power of the probe beam simply mimics the data-effected transient increase in gain. That type of wavelength conversion is the gain-pump analogue of the XGM wavelength conversion method; the data signal pumps the gain instead of saturating it. Cross-gain-pump modulation (XGPM) results in polarity non-inverted signals, in contrast to the inverted XGM signals.

As noted above, an increase in the gain of the SOA is accompanied by a decrease in its refractive index, embodied by the well known linewidth enhancement factor. The nonlinear refractive index shifts the Bragg resonance to shorter wavelengths. Thus, if the wavelength of the probe beam is tuned to the short-wavelength side of the Bragg wavelength, an additional increase in the converted-signal power is expected as the Bragg resonance shifts into the probe beam.

The on-off switching ratio of the XGPM-converted signal, similar to XGM conversion, is proportional to the power of the data signal. In the XGPM case, however, there is an upper bound on the strength of the data signal; the optical pump must not be strong enough to lase the DFB SOA.

For probe beams with wavelengths that are tuned slightly closer to the Bragg resonance, a remarkable change occurs in the converted signal. Initially, the output power of the probe beam increases with the increase in gain-pump power. However, at a certain amount of gain pumping, the converted signal switches down because of the change in hysteresis described above. The output power remains low until the optical gain-pump begins to subside, after which it switches back up. That behavior results in polarity-inverted signals. During that wavelength-conversion process, the converted power is not governed directly by changes in gain. Instead, as for XPM, the nonlinear refractive index dominates. First, the decrease in the refractive index pulls the Bragg resonance onto the probe-signal wavelength. From that state, the probe signal can undergo bistable switching to a lower state; a positive feedback loop pushes the Bragg resonance to even smaller wavelengths and away from the probe-signal wavelength, thus lowering the output power. When the gain-pump power decreases, the opposite process occurs and the converted-signal power returns to a high-output state via upward bistable switching.

Inverted-polarity converted signals occur for a very small probe-signal wavelength range. For a constant input power on the order of 0.5 milliwatts (incident on the DFB SOA), that spectral range has been measured to be 0.03 nm. Thus, for a given DFB SOA, the wavelength-converted signal will occur at a specific wavelength. Separate converters are required for separate lightwave channels. Those wavelength converters would be appropriate for lightwave systems with prespecified channel wavelengths.

For a slightly longer probe-signal wavelength (1547.808 nm), the converted signal obtains its largest on-off switching ratio, which is about 5 dB. Although the same amount of pump power is used for the examples of XGPM just described, bistable switching exhibits a 3.6-dB larger on/off ratio.

The contrast ratio of bistable wavelength conversion is also qualitatively different from that of XGPM. Whereas data transferred via XGPM are proportional to the input power, the characteristics of the bistable-switching converted data are expected to be governed by the bistable hysteresis. Thus, the on-off switching powers are determined by the bistable hysteresis, resulting in a digital transformation that is not expected to depend much on the pump power.

Experimental embodiments of the present invention show that the data signal dynamic range is at least 50 nm for the latching switch operation.

While preferred embodiments of the present invention have been set forth in detail above, those skilled in the art who have reviewed the present disclosure will readily appreciate that other embodiments can be realized within the scope of the invention. For example, a DFB SOA can be replaced by any similarly performing device. Also, different light sources can be used. Furthermore, components shown as discrete need not be; instead, they can be incorporated into monolithic structures. In addition, any suitable device for controlling the set and reset pulses or the pump signal can be used in accordance with the intended use (memory, bit-length conversion, wavelength conversion, etc.). Therefore, the present invention should be construed as limited only by the appended claims.

We claim:

1. A method of controlling a bistable optical device to go from a first stable state to a second stable state, the bistable optical device having hysteresis, the method comprising:
   (a) providing input holding power to the bistable optical device; and
   (b) changing the hysteresis of the bistable optical device such that the bistable optical device goes from the first stable state to the second stable state.

2. The method of claim 1, wherein the bistable optical device is a Fabry-Perot type semiconductor optical amplifier.

3. The method of claim 1, wherein the bistable optical device is a distributed-feedback semiconductor optical amplifier.

4. The method of claim 1, wherein, during step (b), the input holding power is kept constant.

5. The method of claim 1, further comprising:
(c) changing the hysteresis of the bistable optical device again such that the bistable optical devices goes from the second stable state back to the first stable state.

6. The method of claim 5, wherein:
step (b) comprises applying a first optical switching signal to the bistable optical device; and
step (c) comprises applying a second optical switching signal to the bistable optical device.

7. The method of claim 6, wherein the bistable optical device is a semiconductor optical amplifier with a gain spectrum.

8. The method of claim 7, wherein the first optical switching signal has a wavelength which falls within the gain spectrum.

9. The method of claim 8, wherein the second optical switching signal has a wavelength falling outside the gain spectrum on the short-wavelength side of the gain spectrum.

10. The method of claim 6, wherein the first optical switching signal is a data signal.

11. The method of claim 5, further comprising applying a gain control signal to the bistable optical device to control a gain of the bistable optical device, and wherein each of steps (b) and (c) comprises varying the gain control signal.

12. The method of claim 5, wherein steps (b) and (c) are performed in accordance with a data signal to perform wavelength conversion of the data signal.

13. The method of claim 5, wherein steps (b) and (c) are performed in accordance with a data signal to perform pulse-length conversion of the data signal.

14. The method of claim 5, wherein steps (b) and (c) are performed in accordance with a data signal to cause the bistable optical device to function as a memory for the data signal.

15. An apparatus comprising:
a bistable optical device having a first stable state and a second stable state and having hysteresis;
a laser source for providing input holding power to the bistable optical device; and
a control source for controlling the bistable optical device to change the hysteresis of the bistable optical device such that the bistable optical device goes from the first stable state to the second stable state.

16. The apparatus of claim 15, wherein the bistable optical device is a Fabry-Perot type semiconductor optical amplifier.

17. The apparatus of claim 15, wherein the bistable optical device is a distributed-feedback semiconductor optical amplifier.

18. The apparatus of claim 15, wherein the input holding power supplied by the power source is constant.

19. The apparatus of claim 15, wherein the control source also controls the bistable optical device to change the hysteresis of the bistable optical device again such that the bistable optical device goes from the second stable state back to the first stable state.

20. The apparatus of claim 19, wherein the control source comprises:
a first optical switching signal source for applying a first optical switching signal to the bistable optical device to change the hysteresis of the bistable optical device such that the bistable optical device goes from the first stable state to the second stable state; and
a second optical switching signal source for applying a second optical switching signal to the bistable optical device to change the hysteresis of the bistable optical device again such that the bistable optical device goes from the second stable state back to the first stable state.

21. The apparatus of claim 20, wherein the bistable optical device is a semiconductor optical amplifier with a gain spectrum.

22. The apparatus of claim 21, wherein the first optical switching signal has a wavelength which falls within the gain spectrum.

23. The apparatus of claim 22, wherein the second optical switching signal has a wavelength which falls outside the gain spectrum on the short-wavelength side of the gain spectrum.

24. The apparatus of claim 20, wherein:
the first optical switching signal source comprises a first laser; and
the second optical switching signal source comprises a second laser provided separately from the first laser.

25. The apparatus of claim 24, wherein the control source further comprises a coupler for combining the first optical switching signal with the second optical switching signal into an input signal and applying the input signal to the bistable optical device.

26. The apparatus of claim 15, wherein the control source comprises:
a pump laser for generating a gain pump signal and for applying the gain pump signal to the bistable optical device; and
a function generator, pulse generator or external modulator for controlling the pump laser to vary the gain pump signal to change the hysteresis.

27. The apparatus of claim 26, wherein the control source further comprises:
a gain saturation laser for generating a gain saturation signal and for applying the gain saturation signal to the bistable optical device; and
a pulse generator, function generator or external modulator for controlling the gain saturation signal as a series of pulses.

28. An optical memory device comprising:
a bistable optical device having a first stable state and a second stable state and having hysteresis;
a laser source for providing input holding power to the bistable optical device;
a set pulse source for applying a set pulse to the bistable optical device to change the hysteresis of the bistable optical device such that the bistable optical device goes from the first stable state to the second stable state;
a reset pulse source for applying a reset pulse to the bistable optical device to change the hysteresis of the bistable optical device such that the bistable optical device goes from the second stable state back to the first stable state; and
a modulator for modulating at least one of the set pulse source and the reset pulse source in accordance with data to be stored in the optical memory device to control the bistable optical device to go to either the first stable state or the second stable state in accordance with the data to be stored.

* * * * *

UNITED STATES PATENT AND TRADEMARK OFFICE
CERTIFICATE OF CORRECTION

PATENT NO. : 6,456,417 B1
DATED : September 24, 2002
INVENTOR(S) : Maywar et al.

It is certified that error appears in the above-identified patent and that said Letters Patent is hereby corrected as shown below:

Column 1,
Line 2, insert -- This invention was made under a contract with the National Science Foundation under Grant No. 9809932. The government has certain rights in this invention --

Signed and Sealed this

Fifth Day of October, 2004

JON W. DUDAS
*Director of the United States Patent and Trademark Office*